(12) United States Patent
Filsfils et al.

(10) Patent No.: US 12,267,233 B2
(45) Date of Patent: Apr. 1, 2025

(54) METHODS AND APPARATUS FOR ENCODING LOCAL PROCESSING METADATA IN NETWORK HEADERS

(71) Applicant: Cisco Technology, Inc., San Jose, CA (US)

(72) Inventors: Clarence Filsfils, Brussels (BE); Pablo Camarillo Garvia, Madrid (ES); Ahmed Mohamed Ahmed Abdelsalam, L'Aquila (IT); Francois Clad, Strasbourg (FR)

(73) Assignee: Cisco Technology, Inc., San Jose, CA (US)

( * ) Notice: Subject to any disclaimer, the term of this patent is extended or adjusted under 35 U.S.C. 154(b) by 558 days.

(21) Appl. No.: 17/538,513

(22) Filed: Nov. 30, 2021

(65) Prior Publication Data

US 2022/0174004 A1   Jun. 2, 2022

Related U.S. Application Data

(60) Provisional application No. 63/220,946, filed on Jul. 12, 2021, provisional application No. 63/120,036, (Continued)

(51) Int. Cl.
*H04L 45/00* (2022.01)
*H04L 45/302* (2022.01)
*H04L 45/74* (2022.01)

(52) U.S. Cl.
CPC .......... *H04L 45/566* (2013.01); *H04L 45/306* (2013.01); *H04L 45/74* (2013.01)

(58) Field of Classification Search
CPC ..... H04L 45/566; H04L 45/306; H04L 45/74; H04L 45/34; H04L 45/741
See application file for complete search history.

(56) References Cited

U.S. PATENT DOCUMENTS 10,764,175 B1   9/2020   Filsfils et al.
11,095,559 B1 *  8/2021   Garvia ................. H04L 45/124
(Continued)

FOREIGN PATENT DOCUMENTS

WO   2019210769 A1   11/2019

OTHER PUBLICATIONS

International Search Report and Written Opinion for PCT Application No. PCT/US2021/061438, mail dated May 11, 2022, 10 pages.
(Continued)

*Primary Examiner* — Ayaz R Sheikh
*Assistant Examiner* — Mang Boi Thawng
(74) *Attorney, Agent, or Firm* — Polsinelli P.C.

(57) ABSTRACT

Disclosed are systems, apparatuses, methods, and computer-readable media to encode network functions in a packet header. A method includes receiving a first packet from a source device that is to be delivered to a destination address through a network; determining a route to the destination address; identifying at least one network function for the first packet; encapsulating the first packet in a second packet, wherein a header of the second packet includes the route to the destination address in a destination address field and local processing metadata associated with the at least one network function in a source address field; and forwarding the second packet to a next network node of the network identified in the destination address.

16 Claims, 6 Drawing Sheets

Related U.S. Application Data filed on Dec. 1, 2020, provisional application No. 63/120,020, filed on Dec. 1, 2020.

(56) References Cited

U.S. PATENT DOCUMENTS

| | | | |
|---|---|---|---|
| 2005/0089016 A1* | 4/2005 | Zhang | H04L 47/283 370/351 |
| 2011/0019569 A1* | 1/2011 | Venkateswaran | H04L 47/10 370/252 |
| 2016/0142321 A1 | 5/2016 | Gage | |
| 2017/0180257 A1* | 6/2017 | Guichard | H04L 45/74 |
| 2017/0237656 A1 | 8/2017 | Gage | |
| 2020/0351766 A1 | 11/2020 | Young | |
| 2021/0092053 A1 | 3/2021 | Filsfils et al. | |
| 2021/0243107 A1* | 8/2021 | Retana | H04L 45/34 |
| 2022/0166722 A1* | 5/2022 | Dave | H04L 45/50 |
| 2022/0200893 A1* | 6/2022 | Yao | H04L 41/5054 |
| 2023/0069502 A1* | 3/2023 | Li | H04L 45/741 |
| 2023/0142996 A1* | 5/2023 | Saad | H04L 45/745 |

OTHER PUBLICATIONS

Tulumello, A., et al., "Micro SIDs: a solution for Efficient Representation of Segment IDs in SRv6 Networks," Oct. 16, 2020, 16th International Conference on Network and Service Management (CNSM), IFIP, 12 pages.

Bryant, S., et al., "A unified Approach to IP Segment Routing," No. 1, Aug. 11, 2017, 1-16 pages.

Cheng et al., "Encoding Network Slice Identification for SRv6," Spring WG, Jul. 12, 2021, pp. 1-6.

\* cited by examiner

METHODS AND APPARATUS FOR ENCODING LOCAL PROCESSING METADATA IN NETWORK HEADERS

CROSS-REFERENCE TO RELATED APPLICATIONS

This application claims the benefit of U.S. Provisional Application No. 63/120,020, filed on Dec. 1, 2020, U.S. Provisional Application No. 63/220,946, filed on Jul. 12, 2021, and U.S. Provisional Application No. 63/120,036, filed on Dec. 1, 2020, all of which are hereby expressly incorporated by reference in their entirety.

BACKGROUND

The communications industry is rapidly changing to adjust to emerging technologies and ever-increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology using Internet Protocol (IP). IP packets are typically forwarded in a network based on one or more values representing network nodes or paths.

Segment routing (SR) is a network technology that can enhance packet switching using a source routing paradigm. In an SR network, a source node chooses a path and encodes it in the packet header as an ordered list of segments that provide a unidirectional list of segments that identify the designated routing path. After a segment has been traversed, the label identifying that segment is popped from the ordered list of segments.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Disclosed are systems, apparatuses, methods, and computer-readable media for encoding local processing metadata in network headers. According to at least one example, a method is provided for encoding local processing metadata in network headers. The method includes: receiving a packet from a source device that is to be delivered to a destination address through a network; determining a route to the destination address; encapsulating the packet, wherein a header of the encapsulated packet includes the route to the destination address in a destination address field and local processing information associated with at least one local processing function in a source address field; and forwarding the encapsulated packet to a next network node of the network identified in the destination address.

In another example, a network node for encoding local processing metadata in network headers is provided that includes a memory (e.g., configured to store data, such as virtual content data, one or more images, etc.) and one or more processors (e.g., implemented in circuitry) coupled to the memory. The one or more processors are configured to and can: receive a packet from a source device that is to be delivered to a destination address through a network; determine a route to the destination address; encapsulate the packet, wherein a header of the encapsulated packet includes the route to the destination address in a destination address field and local processing information associated with at least one local processing function in a source address field; and forward the encapsulated packet to a next network node of the network identified in the destination address.

In another example, a non-transitory computer-readable medium is provided that has stored thereon instructions that, when executed by one or more processors, cause the one or more processors to: receive a packet from a source device that is to be delivered to a destination address through a network; determine a route to the destination address; encapsulate the packet, wherein a header of the encapsulated packet includes the route to the destination address in a destination address field and local processing information associated with at least one local processing function in a source address field; and forward the encapsulated packet to a next network node of the network identified in the destination address.

In some aspects, the local processing information is located in least significant bits of the source address field.

In some aspects, one or more of the methods, apparatuses, and computer-readable medium described above further comprise: performing the at least one local processing function in the local processing information.

In some aspects, information associated with the at least one local processing function includes at least one of a slice identifier that identifies packet treatment, entropy for load balancing operations, a path identifier for determining packet loss in the network, or per-packet marking bits for control, telemetry, and security functions.

In some aspects, the local processing information includes a slice identifier that identifies treatment of the encapsulated packet.

In some aspects, the local processing information includes entropy bits for load balancing operations.

In some aspects, the local processing information includes a path identifier that identifies the route for monitoring performance of the network.

In some aspects, the local processing information includes per-packet marking bits for control, telemetry, and security functions.

In some aspects, the encapsulated packet comprises an IPv6 packet.

In some aspects, one or more of the methods, apparatuses, and computer-readable medium described above further comprise: receiving packet including a control message associated with another network node from a requesting device; encapsulating the packet including the control message, wherein a header of the packet includes a destination address including a route to the other network node, wherein least significant bits of a source address of the encapsulated packet are masked based on a length of the local processing information; and forwarding the encapsulated packet to a next network node of the network identified in the destination address.

Overview

Systems, methods, and computer-readable media are disclosed for encoding local processing metadata in headers for segment routing (SR) networks. In some examples, a packet in an SR network may include local processing metadata that is encoded into a 128-bit source address field. Because the local processing metadata is encoded into the source address field, each network node can process function identified in the local processing metadata at a hardware level such as an application specific integrated circuit (ASIC) or functional programmable gate array (FPGA), which is significantly faster than at a software level, and improve the capacity, latency, and jitter of the network node.

Example Embodiments

SR is becoming increasingly popular for software defined networking (SDN) networks. An SR network can use an SR policy to steer traffic through the network. The SR policy provides a list of segments in an internet protocol (IP) header that specifies a unidirectional path from a source node to a destination node in the network. When a network node that corresponds to a segment in the list of segments receives a packet, the network node can process the IP header in hardware to determine the next network entity based on the list of segments and forward the packet to the next network node. Processing the IP header in hardware is more efficient than processing the IP header in software and allows the network node to handle route packets.

The present technology encodes an explicit path containing a plurality of network apparatuses into a single IPv6 address may allow a network apparatus to process SR packets efficiently. SR can also use a micro-segment identifier (μSID or uSID), which encodes the explicit path in the SR header and provides more efficient performance by ensuring that the packet is processed in the hardware.

Figure 1:
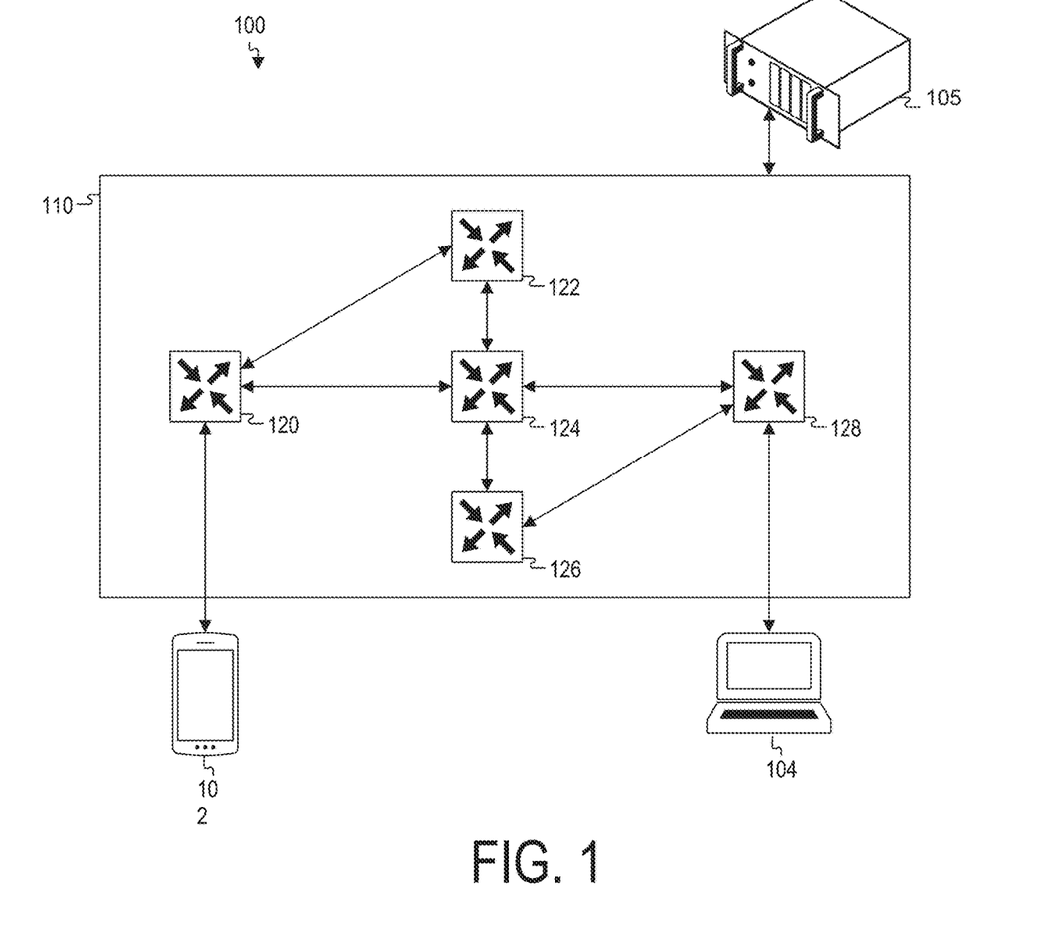
FIG. 1 illustrates an example of a segment routing (SR) network according to an example of the instant disclosure.

FIG. 1 illustrates an example of a network 100 according to an example of the instant disclosure. A network administrator uses a controller 105 to configure a control plane in a network and perform various control, administration, and management functions. For example, the controller 105 could configure the various devices to implement an SR network 110. In other examples, the controller 105 may not be required and the network nodes can be SR-aware and not need configuration from the control plane. The controller 105 can be implemented by a computing device, such as computing system 800 illustrated in FIG. 8. The SR network 110 is a segment routing network that includes nodes 120, 122, 124, 126, and 128. Each of these nodes can be, for example, a router, a switch, or another suitable node. The SR network 110 is generally a wired network but could be implanted in a wireless network (e.g., 802.11 variants such as 802.11ax, 802.11be, etc.), a cellular network (e.g., 4G, 5G, etc.), a combination of wired and wireless network, and/or can use any other suitable physical transmission medium. The SR network 110 can be used to provide a connection between user devices 102 and 104.

For example, user device 102 can transmit data to user device 104 using the SR network 110. The user device 102 is connected to the node 120, while the user device 104 is connected to the node 128. The network administrator uses the controller 105 to establish a path between the node 120 and the node 128. For example, the controller 105 can establish a path from the node 120 through the node 124 to the node 128. The controller 105 can install an SR policy including this path. Traffic flowing from the user device 102 to the user device 104 is routed through this SR policy.

Similarly, the controller 105 can establish a reverse path from the node 128 to the node 120. This path could include the node 128 to the node 126 to the node 124 to the node 120. The controller 105 can install a second SR policy including this path. Traffic flowing from the user device 104 to the user device 102 is routed through this second SR policy. In some example SR networks, the SR policy from the node 120 to the node 128 is not associated with the reverse SR policy from node 128 to node 120. Each SR policy is unidirectional.

Figure 2:
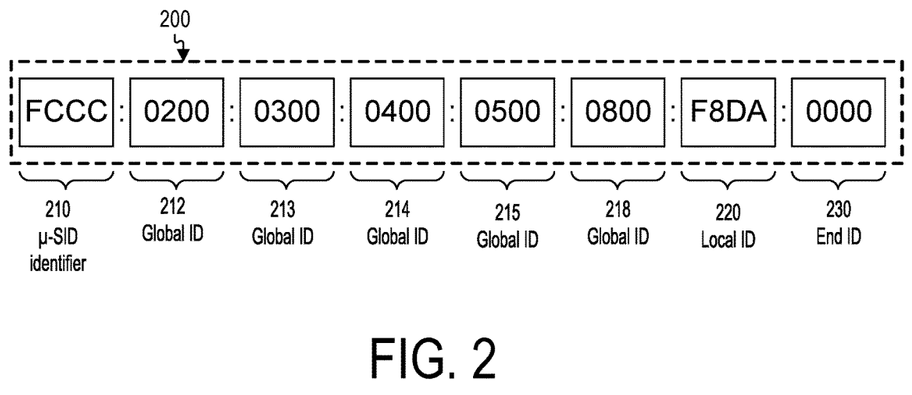
FIG. 2 illustrates an example of a micro-segment identifier (μSID) that can be used to address network nodes to route network traffic in an SR network according to an example of the instant disclosure.

FIG. 2 illustrates an example of a μSID 200 that can be used to address network nodes to route network traffic in an SR network according to an example of the instant disclosure. The μSID 200 may include a μSID identifier block 210 in the destination address field of the IPv6 header that advertises that the address of the IP packet corresponds to a μSID. In some examples, FC/8 is available to any operator as a unique local address (ULA) space, any leading bit string that starts with FC may be used as a μSID identifier block 210 and an operator may use FCCC/16 as the μSID identifier block 210.

In some examples, a μSID 200 may comprise one or more encoded identifiers. An encoded identifier may be a global identifier that may uniquely identify a network apparatus in a network domain. In some examples, a global identifier may be associated with one or more instructions. In some examples, an encoded identifier may be a local identifier. A local identifier may be associated with one or more instructions. A local identifier may uniquely identify one or more instructions within a network apparatus associated with the local identifier. When a first network apparatus corresponds to a first global identifier and a second network apparatus corresponds to a second global identifier, a particularly encoded local identifier at the first network apparatus may correspond to instructions different to instructions corresponding to the particularly encoded local identifier at the second network apparatus. In some examples, a μSID may include an end identifier that indicates that the identifier preceding the end identifier in the μSID is a last encoded identifier.

The μSID 200 illustrated in FIG. 2 comprises a μSID identifier block 210, global identifier 212, global identifier 213, global identifier 214, global identifier 215, global identifier 218, a local identifier 220, and an end identifier 230. In some examples, padding bits (not shown) are inserted after the end identifier 220. In some examples, additional addresses may be identified based on a local identifier that indicates that an SR header (SRH) includes additional addresses.

In some examples, a global identifier may comprise one or more predetermined bit sequences. A network apparatus may identify a global identifier based on the one or more predetermined bit sequences encoded in the global identifier. A local identifier may comprise one or more predetermined bit sequences. A network apparatus may identify a local identifier based on the one or more predetermined bit sequences encoded in the local identifier. As an example, illustrated in FIG. 2, a length of a global identifier is four nibbles (16 bits). The first nibble (four bits) of a global identifier may be zero. Thus, a network apparatus may determine that the global identifier 212 is a global identifier based on the first nibble of the global identifier 212 being zero. As another example, illustrated in FIG. 2, a length of a local identifier 220 is four nibbles (16 bits). The first nibble of the identifier 220 may be "F" to indicate a local identifier. Although this disclosure describes a particular length of an encoded identifier, this disclosure contemplates any suitable length of an encoded identifier. Although this disclosure describes determining global identifiers and local identifiers in a particular manner, this disclosure contemplates determining global identifiers and local identifiers in any suitable manner.

In some examples, an end identifier 230 may comprise one or more predetermined bit sequences. A network apparatus may identify an end identifier based on the one or more predetermined bit sequences encoded in the local identifier. As illustrated in the example of FIG. 2, a length of an end identifier 230 is four nibbles (16 bits) and is encoded "0000" to indicate an end identifier. Although this disclosure describes a particular end identifier, this disclosure contemplates any suitable end identifier.

In some examples, the μSID identifier block concatenated by a first global identifier may be a first address corresponding to a first network apparatus. The first network apparatus may advertise the first address within the network domain. Other network apparatuses within the network domain may update their corresponding forwarding tables upon receiving the advertised first address. When a packet with the first address arrives at a network apparatus, the network apparatus may forward the packet such that the packet is routed to the first network apparatus within the network domain.

Figure 3:
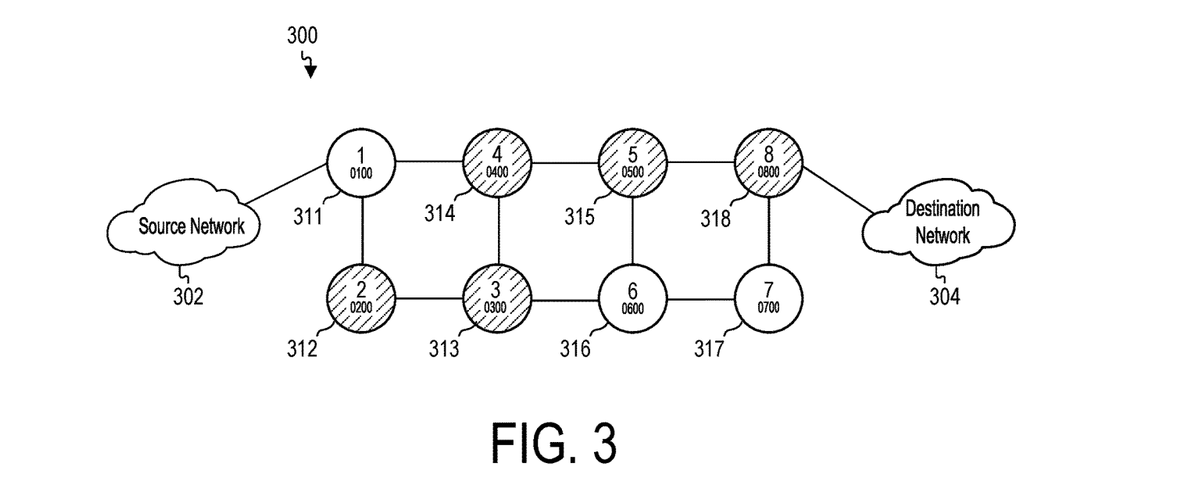
FIG. 3 illustrates an example packet forwarding based on a μSID according to an example of the instant disclosure.

FIG. 3 illustrates forwarding an example packet in an SR network 300 from a source network 302 (or network node) to a destination network 304 (or network node) based on a μSID according to an example of the instant disclosure. The example network illustrated in FIG. 3 includes various network nodes configured to process SR packets including a first network node 311, a second network node 312, a third network node 313, a fourth network node 314, a fifth network node 315, a sixth network node 316, a seventh network node 317, and an eighth network node 318. In this example, first network node 311 corresponds to μSID address "0100", second network node 312 corresponds to μSID address "0200", third network node 313 corresponds to μSID address "0300", fourth network node 314 corresponds to μSID address "0400", fifth network node 315 corresponds to μSID address "0500", sixth network node 316 corresponds to μSID address "0600", seventh network node 317 corresponds to μSID address "0700", and eighth network node 318 corresponds to μSID address "0800."

In some examples, a source network 302 may want to send a packet to a destination network 304 through a pre-determined forwarding path in the SR network 300. The first network node 311 is an ingress node for traffic from the source network 302 and the eighth network node 318 is an egress node for network traffic to the destination network 304. The first network node 311 receives a packet from the source network 302 and computes, or causes another network controller, to compute the route through the SR network 300. In this example, the route to the destination network 304 is "FC00:0200:0300:0400:0500:0800:F8DA:0000" as identified in the μSID 200 including the second network node 312, the third network node 313, the fourth network node 314, the fifth network node 315 and the eighth network node 318. The first network node 311 also computes, or causes another network controller, to compute a packet treatment or functions that are performed locally (e.g., local processing) by network nodes during transit of the packet. The treatment of the packet can vary and can include, for example, a slice identifier that applies a quality of service (QoS), a path identifier for counting packets to determine path loss, and other functions further described below.

The first network node 311 encapsulates the packet in an IPv6 packet and includes the route to the destination network 304 in the destination address field of the header of the IPv6 packet. The first network node 311 can also encode the packet treatment or functions that are performed locally (e.g., local processing) by network nodes during transit of the packet as local processing metadata in least significant bits of the source address of the IPv6 packet.

The first network node 311 can locally perform functions associated with the local processing metadata. For example, the local processing metadata can include a path identifier is used to determine packet loss between the ingress node (e.g., the first network node 311) and the egress node (e.g., the eighth network node 318). The local processing metadata can also identify a slice identifier and the first network node 311 may process the packet according to QoS and other traffic engineering rules associated with that slice identifier. After performing the local functions, the first network node 311 can identify functions in the destination address to perform. In some examples, a portion of a prefix (e.g., 32 bits) of the μSID 200 is matched (e.g., "FCCC:0200/32") to identify a function to perform. For example, the first 16 bits ("FCCC") may be shifted to identify a next instruction ("0200"). In this case, the instruction may be an address encoded in the forwarding information base (FIB) to indicate a next hop for the packet. In other examples, the instruction may be a type of function for that specific network node to perform. For example, an instruction may be to perform a deep packet inspection to read addresses in an SRH.

In some examples, the second network node 312 may receive a packet comprising a destination address including μSID 200. The destination address may comprise the μSID 200 concatenated by the second global identifier 212. The second network node 312 may determine that the second global identifier 212 corresponds to the second network node 312 and then may identify one or more instructions associated with the second global identifier 212 by looking up "FCCC:0200/32" in the FIB of the second network node 312 and determine that the instructions are to update the destination address in the destination field of the packet to an updated destination address. In response, the second network node 312 may update the address in the destination field of the packet to an updated destination address and then forward the packet to the updated destination address. For example, the second network node 312 may shift the bits after the μSID identifier block 210 by the length of the second global identifier 212 (e.g., 16 bits) to pop (e.g., remove) the address of the second global identifier 212 from the μSID 200. The second network node 312 may concatenate the remaining μSID identifier block 210 and the remaining addresses in the μSID 200. In that case, the 32 most significant bits in the μSID would be "FCCC:0300," which corresponds to the μSID identifier block 210 and the address of the third global identifier 213 associated with the third network node 313.

In some examples, the second network node 312 may determine that the packet includes local processing metadata in the source network address and may perform functions identified in the local processing metadata. As further described below with respect to FIG. 4, the source network address in the IP header of the packet may include local processing metadata that identifies one or more local functions for the second network node 312 to perform, which may or may not be associated with the packet. For example, the local processing metadata can include a slice identifier that the second network node 312 may use to determine how to process the packet. In other example, the local processing metadata may identify marking bits to trigger particular functionalities at the router like operation, administration and management (OAM) functions and so forth. After performing any local functions based on the local processing metadata in the source address, the second network node 312 may perform a lookup of the next address in the destination address of the μSID 200 (e.g., "0300") in a forwarding table and transmit the packet to the third network node 313.

The third network node 313 performs the instructions identified in the μSID 200, which are similar to the instructions provided to the second network node 312 and causes the third network node 313 to perform functions associated with the local processing metadata and to update the destination address in the IP header and forward the packet to the next node associated with the fourth network node 314 based on the fourth global identifier 214 in the μSID 200. This process continues until the packet is received at eighth network node 318, which identifies that the next instruction in the μSID 200 is an end identifier 217. The eighth network node 318 de-encapsulates the packet and transmits the packet to the destination network 304.

Because the μSID 200 is within the destination address of an IP header, the μSID 200 can be processed in hardware (e.g., by an ASIC or FGPA) by network nodes 311-318 and each of the network nodes 311-318 can identify the destination in hardware without inspecting the packet. By processing the packets in hardware, each of the network nodes 311-318 can increase the number of packets processed to increase bandwidth while simultaneously reducing latency and jitter. Further, a local processing metadata can be included in the source address field and the hardware can be configured to identify and perform packet functionalities based on the local processing metadata.

Figure 4:
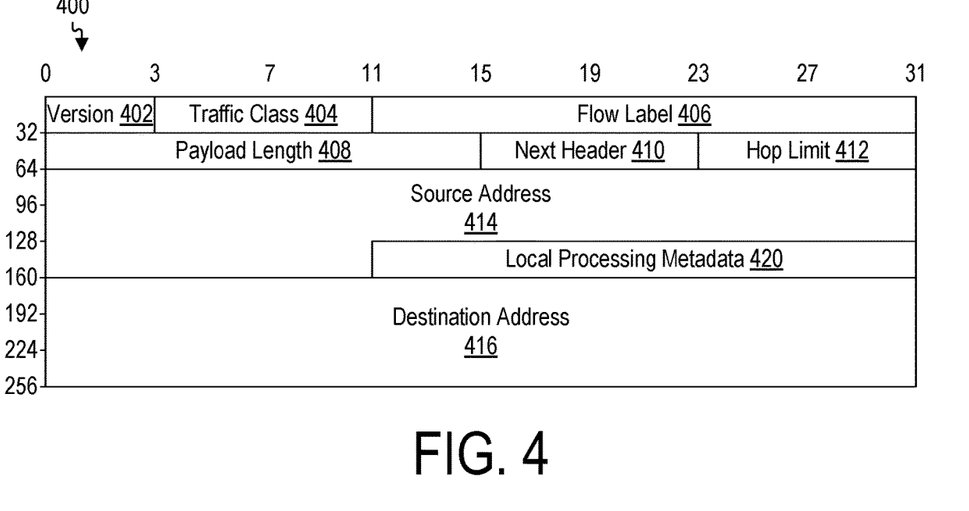
FIG. 4 illustrates an example internet protocol (IP) header that includes local processing metadata according to an example of the instant disclosure.

FIG. 4 illustrates an IPv6 header 400 for an SR network that includes local processing metadata encoded in a source destination address according to an example of the instant disclosure.

The IPv6 header includes a version 402, a traffic class 404, a flow label 406, a payload length 408, a next header 410, a hop limit 412, a source address 414, and a destination address 416. In some examples, local processing metadata 420 can be encoded or provided into the least significant bits of the source address 414 in an SR network.

The version 402 is 4-bits and represents the version of IP packet (e.g., 0110 for IPv6). The traffic class 404 is 8-bits and includes two portions: the most significant 6 bits are used for type of service to let the router known what services should be provided to this packet and the least significant 2 bits are used for explicit congestion notification (ECN). The flow label 406 is 20-bits and is used to maintain the sequential flow of the packets belonging to a communication. The source labels the sequence to help the router identify that a particular packet belongs to a specific flow of information. This field helps load balancing by transit routers by preventing re-ordering of data packets in the same data flow.

The payload length 408 is 16-bits and is used to tell the routers how much information a particular packet contains in its payload. The payload can be composed of extension headers and upper layer data. with 16 bits, up to 65535 bytes can be indicated; but if the extension headers contain a hop-by-hop extension header, then the payload may exceed 65535 bytes and this field is set to 0. The next header is 8-bits and is used to indicate either the type of extension header, or if the extension header is not present then it indicates the upper layer protocol data unit (PDU). The hop limit 412 is 8-bits and is used to stop packets from being configured in an infinite loop. The value of hop limit 412 is decremented by 1 as it passes a link (router/hop) and the packet is discarded when the hop limit 412 reaches 0.

The source address 414 is 128 bits and is used to identify the address of originator of the packet. The destination address 416 is 128 bits and is used to identify the address of the intended recipient of the packet.

In some examples, the source address 414 is configured to include metadata (e.g., local processing metadata) for use by network nodes. As noted above, in an SR network, the destination address 416 is used to identify a route to a destination network node. Typically, the first 64 bits of the source address 414 are used to identify the source node of the packet in the network, and the last 64 bits identify the interface (e.g., the loopback) of the source node. However, 64 bits are generally not needed to identify a single interface (e.g., a single loopback interface) on the node.

In some examples, bits from the source address 414 can be used for other purposes such as local processing metadata 420 that identifies local processing of the packet at a network node. For example, the local processing can include a QoS treatment based on a slice identifier, a path identifier that can be used for various OAM functions, extended entropy for load balancing operations, and per-packet marking bits that identify a function to perform such as copy the packet to telemetry engine. Other local functions can be included into the local processing metadata 420. In one example, the source address 414 is encoded into the least significant bits and the source address will therefore contain the address of the source node, the interface of the source node, and then the local processing metadata 420.

Because the local processing metadata 420 is encoded into the IPv6 header, the hardware (e.g., an ASIC or an FPGA in the network node) of the network node can be configured to read the local processing metadata 420 encoded into the source address 414 and perform the function. For example, in the case of a slice identifier, the network node can use a hardware lookup to identify a packet flow associated with a slice identifier in the local processing metadata and process the packet in hardware based on the identified packet flow to provide a service level agreement (SLA). In some examples, an SLA is combination of traffic engineering using the destination address (e.g., the µSIDs) and a QoS treatment that is enforced at a network node based on the slice identifier.

In some examples, the local processing metadata 420 can include a slice identifier that identifies a network slice. The slice identifier enables the multiplexing of virtualized and independent logical networks on the same physical network infrastructure. In some examples, different applications may have different connectivity requirements and may require SLA to ensure end-to-end treatment of network traffic. To ensure that the packets of each application meet a specified SLA, a network slice identifier can be used to identify the network slice and configure each network entity in the network route to configure its packet processing function to satisfy the SLA. The slice identifier provides a per-flow context to ensure that the SLA is satisfied. Network slicing leverages the concepts of SDN and network function virtualization (NFV) that allow the implementation of flexible and scalable network slices on top of a common network infrastructure.

In some examples, the local processing metadata 420 can include extended entropy bits that are used in the data plane for load-balancing. An ingress router computes a hash based on several fields from a given packet and places the result in an additional label named entropy label such as the flow label field. The entropy label is used by a label switching router (LSR) as part of the hash keys to reduce the need for deep packet inspection in the LSR and use the entropy labels for load-balancing. In some examples, there are 12 bits available of entropy in the flow label field, which may not be enough for certain networks, such as large networks with a large number of equal-cost multi-path routing (ECMP) paths. Accordingly, in some examples, the local processing metadata 420 can include additional entropy bits that are appended to the content in the flow label field. In other examples, the local processing metadata 420 can include all of the entropy bits.

In some examples, the local processing metadata 420 can include a path identifier for identifying a path loss. The path identifier is a unique identifier that is mapped to a network parameter (e.g., a network slice, a network connection, etc.) used to count traffic and determine path loss between the ingress router and the egress router. The ingress router and egress router maintain a counter and path loss of the tunnel can be determined based on a comparison of the counter in the ingress router and the counter in the egress router.

In some examples, the local processing metadata 420 can include per-packet marking bits. The marking bits can be used to facilitate traceroute and trackback functions for network security and network diagnosis. In some other examples, the per-packet marking bits can be used to trigger specific treatment of a packet such as sending a copy of the packet to a telemetry engine for packet processing.

In some examples, the local processing metadata 420 can be static and can be configured at the network level so that each network node is aware of the configuration of the local processing metadata 420. For example, in one example, the local processing metadata 420 can be the 16 least significant bits of the source address 414 and have 16 bits allocated to a slice identifier. The length and configuration of the local processing metadata 420 are configured by a network operator and can include combinations of different functions.

In some examples, the local processing metadata 420 can be dynamic and can be configured to have different lengths and different functions. Table 1 below illustrates an example that uses the 4 least significant bits of the local processing metadata 420 to express a format of the local processing metadata.

TABLE 1

| Least Significant Bits | Local processing metadata Length | Slice ID bits | Entropy bits | Path ID bits | Marking bits |
|---|---|---|---|---|---|
| 0000 | 16 | 12 | 0 | 0 | 0 |
| 0001 | 16 | 0 | 12 | 0 | 0 |
| 0010 | 16 | 0 | 0 | 12 | 0 |
| 0011 | 16 | 0 | 0 | 0 | 12 |
| 0100 | 20 | 16 | 0 | 0 | 0 |
| 0101 | 20 | 0 | 16 | 0 | 0 |
| 0110 | 20 | 0 | 0 | 16 | 0 |
| 0111 | 20 | 0 | 0 | 0 | 16 |
| 1000 | 32 | 14 | 14 | 0 | 0 |
| 1001 | 32 | 14 | 0 | 14 | 0 |
| 1010 | 32 | 14 | 0 | 0 | 14 |
| 1011 | 32 | 0 | 14 | 0 | 14 |
| 1100 | 32 | 0 | 14 | 7 | 7 |
| 1101 | 32 | 7 | 7 | 0 | 14 |
| 1110 | 32 | 7 | 0 | 7 | 14 |
| 1111 | 32 | 7 | 7 | 7 | 7 |

A network operator can configure a lookup table in hardware that identifies the various function configurations and, using the least significant bits, can perform processing based on the functions identified in the local processing metadata 420. Although the example illustrated in Table 1 identifies a 4-bit map, the map size can be configured by a network operator to have other sizes (e.g., 3-bits, etc.) and the size of the local processing metadata can also be configurable.

Figure 5:
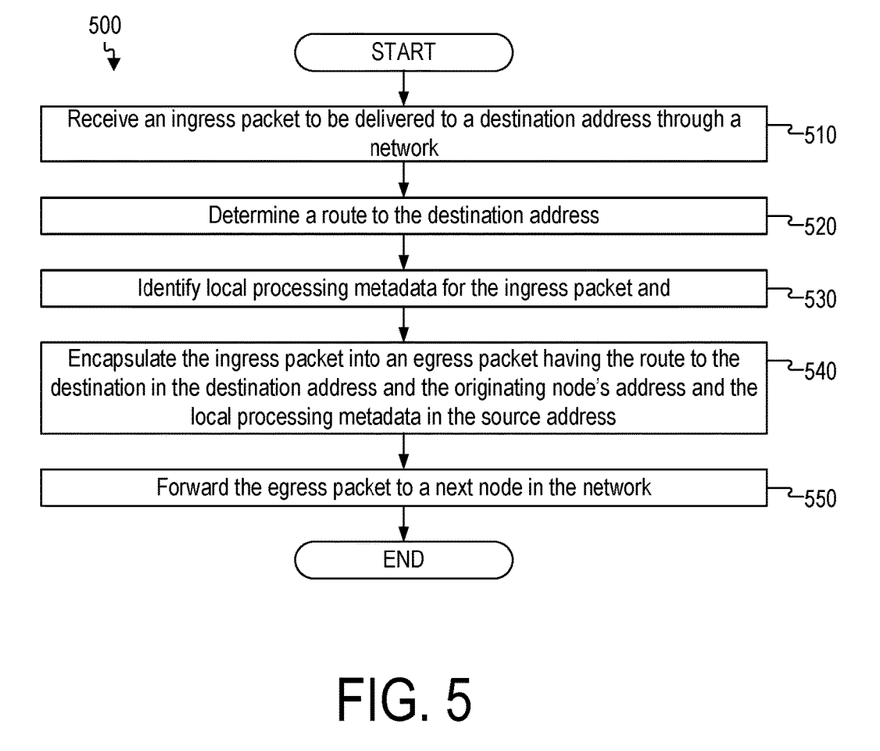
FIG. 5 illustrates a flowchart of a method for a network node to configure a header of a packet for transmission in an SR network with local processing metadata according to an example of the instant disclosure.

FIG. 5 illustrates a flowchart of a method for a network node to configure a header of a packet for transmission in an SR network with functions according to an example of the instant disclosure. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method includes receiving an ingress packet from a source device that is to be delivered to a destination address through a network at block 510. For example, the interfaces 902 illustrated in FIG. 9 may receive an ingress packet from a source device that is to be delivered to a destination address through a network.

According to some examples, the method includes determining a route to the destination address at block 520. For example, the ASIC 912 may determine a route to the destination address by performing a lookup in a hardware table.

According to some examples, the method includes identifying at least one function for the packet to be performed by network nodes at block 530. For example, the ASIC 912 may identify local processing metadata for the packet. In some examples, the local processing metadata identifies a function for network nodes to perform such as a provide a QoS. The method includes encapsulating (e.g., by the ASIC 912) the ingress packet in an egress packet, the second packet including the route to the destination in the destination address and the originating node's address and the local processing metadata in the source address at block 540.

As described above with reference to FIGS. 2 and 3, the header of the egress packet includes the route to the destination address in a destination address field and local processing metadata associated with the at least one function in a source address field. In some examples, the local processing metadata is located in least significant bits of the source address field and the packet has an IPv6 configuration.

The local processing metadata can be static or dynamic. In a static configuration, the local processing metadata is configured to have one or more functions that is performed by a network node. For example, local processing metadata can be 16-bits with 8-bits allocated to a slice identifier and 8-bits can be allocated to entropy. In other examples, the bits can be allocated to a single function such as a slice identifier, entropy bits, a path identifier, and per-packet marking bits. In a dynamic configuration, the bits of the local processing metadata can change based on mapping bits that identify many different configurations as illustrated in Table 1 above.

According to some examples, the method 600 includes forwarding (e.g., by the ASIC 912 via the interfaces 902) the second packet to a next network node of the network identified in the destination address at block 550.

Figure 6:
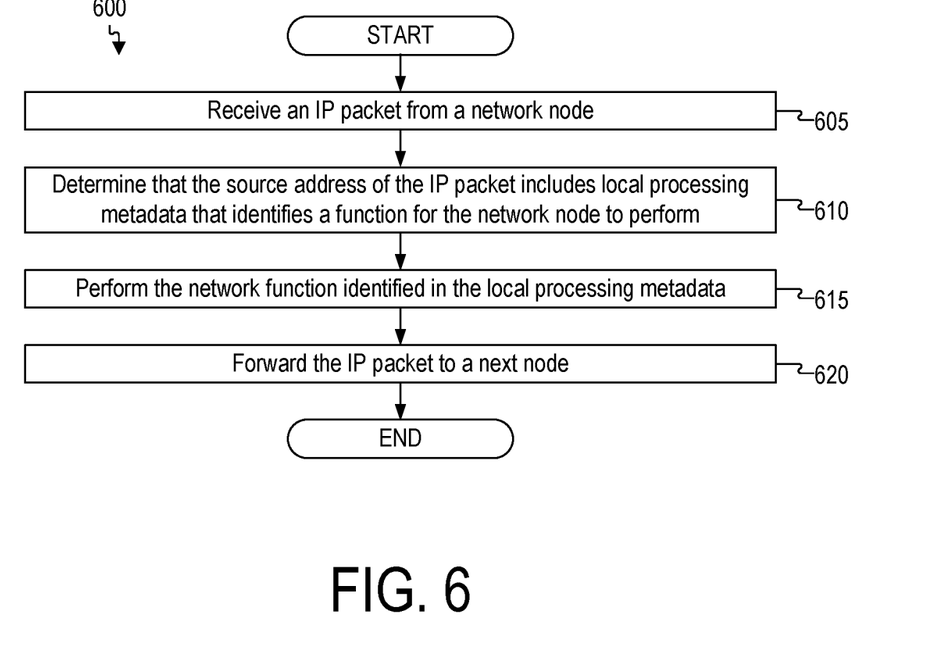
FIG. 6 illustrates a flowchart of a method for a network node to perform functions based on local processing metadata in a header of an IP packet according to an example of the instant disclosure.

FIG. 6 illustrates a flowchart of a method 600 for a network node to perform functions based on a local processing metadata in a header of an IP packet according to an example of the instant disclosure. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 includes receiving (e.g., via the interfaces 902) an IP packet from a network node at block 605. A header of the IP packet includes a route to a destination address in a destination address field and local processing metadata including a function in a source address field. The local processing metadata is located in least significant bits of the source address field. According to some examples (e.g., in a SR network), the method 600 includes modifying (e.g., by the ASIC 912) the header of the IP packet to remove an address of the network node receiving the IP packet.

According to some examples, the method 600 includes determining (e.g., by the ASIC 912) that the source address of the IP packet includes the local processing metadata that identifies a function for the network node to perform at block 610.

In one example, the configuration of the local processing metadata can be dynamic and identify a slice identifier that identifies how other network nodes in the network will treat the IPv6 packet, entropy for load balancing operations, a path identifier for determining packet loss in the network, or per-packet marking bits. In another example, the configuration of the local processing metadata can be static and have a preformatted structure that includes one of a network slice identifier, entropy information, path identifier, and per-packet marking bits that identify an operation to perform on packet. In this example, the network node is configured to use a fixed amount of least significant bits.

According to some examples, the method 600 includes performing (e.g., by the ASIC 912) the function identified in the local processing metadata at block 615. After performing the function, the method 600 includes forwarding (e.g., by the ASIC 912 via the interfaces 902) the IP packet to a next node identified in the IP packet at block 620. The local processing metadata is not altered during transit and each transit router that receives the packet will perform equal treatment of the packet.

Figure 7:
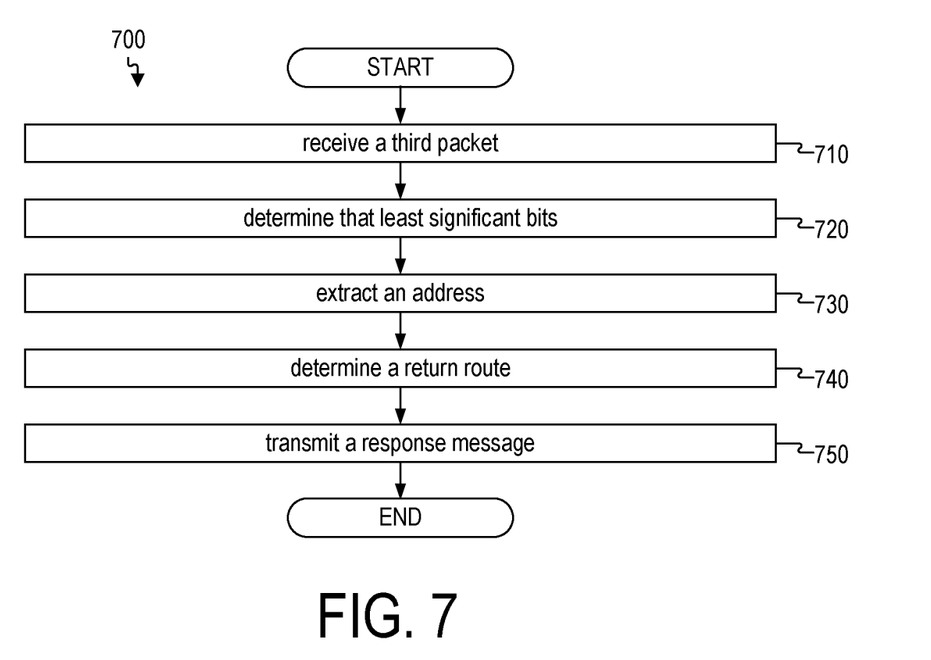
FIG. 7 illustrates a flowchart of a method for a network node to configure a control message for transmission in an SR network according to an example of the instant disclosure.

FIG. 7 illustrates a flowchart of a method 700 for a network node to process a control message in an SR network according to an example of the instant disclosure. In some examples, an internet control message protocol (ICMP), or a control message, may need to be processed differently to ensure that the control message is conveyed to the destination address.

According to some examples, the method 700 includes receiving (e.g., by the ASIC 912 via the interfaces 902) a packet including a control message from a requesting device at block 710. After receiving the packet including a control message, the method 700 includes determining (e.g., by the ASIC 912) that least significant bits in a source address of a header of the third packet are masked to exclude local processing metadata at block 720.

The method 700 includes extracting (e.g., by the ASIC 912) an address of the requesting device from most significant bits in the source address of the header of the third packet at block 730. The method 700 determines (e.g., by the ASIC 912) a return route to the requesting device at block 740. According to some examples, the method 700 includes transmitting (e.g., by the ASIC 912 via the interfaces 902) a response message to the requesting device in a fourth packet at block 750. A header of the fourth packet includes the return route to the requesting device in a destination address field.

In some examples, the method 700 allows the network node to receive a packet that has the local processing metadata is masked in the encapsulating packet to ensure that the source address in the header is processed the same as other packets and can formulate a suitable response in an SR network.

Figure 8:
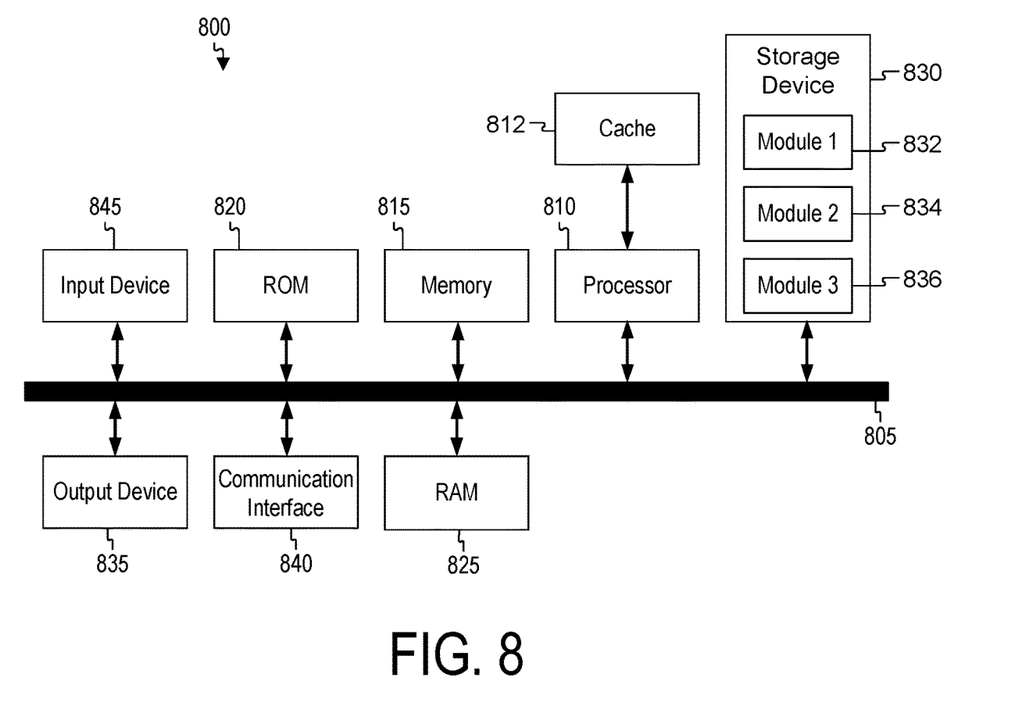
FIG. 8 shows an example of a computing system, which can be for example any computing device that can implement components of the system.

FIG. 8 shows an example of computing system 800, which can be for example any computing device making up any network node such as the first network node 311, the second network node 312, third network node 313, fourth network node 314, fifth network node 315, sixth network node 316, seventh network node 317, eighth network node 318 or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a data-center, multiple data-centers, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, RAMs, ROMs, and/or some combination of these devices.

The storage device 830 can include software services, servers, services, etc., that, when the code that defines such software is executed by the processor 810, causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Figure 9:
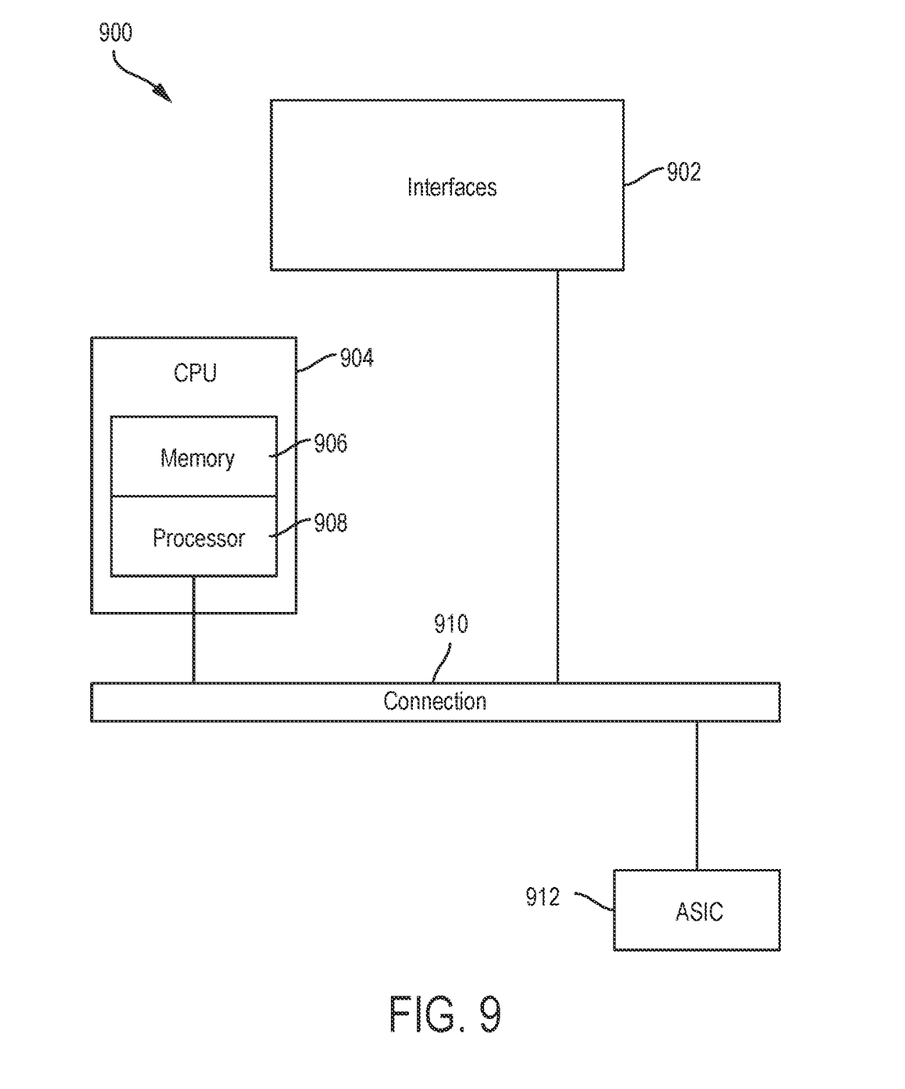
FIG. 9 illustrates an example network device in accordance with some examples of the disclosure.

FIG. 9 illustrates an example network device 900 suitable for performing switching, routing, load balancing, and other networking operations. The example network device 900 can be implemented as switches, routers, nodes, metadata servers, load balancers, client devices, and so forth.

Network device 900 includes a central processing unit (CPU) 904, interfaces 902, and a bus 910 (e.g., a peripheral component interconnect (PCI) bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, digital subscriber line (DSL) interfaces, token ring interfaces, and the like. In addition, various very high-speed interfaces may be provided such as fast token ring interfaces, wireless interfaces, Ethernet interfaces, Gigabit Ethernet interfaces, asynchronous transfer mode (ATM) interfaces, high-speed serial interfaces (HSSI), point-of-sale (POS) interfaces, fiber distributed data interface (FDDI), WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 904) to efficiently perform routing computations, network diagnostics, security functions, etc.

Although the system shown in FIG. 9 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an ASIC, which can be configured to perform routing and/or switching operations. The ASIC can communicate with other components in the network device 900 via the bus 910, to exchange data and signals and coordinate various types of operations by the network device 900, such as routing, switching, and/or data storage operations, for example.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method comprising receiving a packet from a source device that is to be delivered to a destination address through a network; determining a route to the destination address; encapsulating the packet, wherein a header of the encapsulated packet includes the route to the destination address in a destination address field and local processing information associated with at least one local processing function in a source address field; and forwarding the encapsulated packet to a next network node of the network identified in the destination address.

Aspect 2. The method of Aspect 1, wherein the local processing information is located in least significant bits of the source address field.

Aspect 3. The method of any of Aspects 1 to 2, further comprising performing the at least one local processing function in the local processing information.

Aspect 4. The method of any of Aspects 1 to 3, wherein information associated with the at least one local processing function includes at least one of a slice identifier that identifies packet treatment, entropy for load balancing operations, a path identifier for determining packet loss in the network, or per-packet marking bits for control, telemetry, and security functions.

Aspect 5. The method of any of Aspects 1 to 4, wherein the local processing information includes a slice identifier that identifies treatment of the encapsulated packet.

Aspect 6. The method of any of Aspects 1 to 5, wherein the local processing information includes entropy bits for load balancing operations.

Aspect 7. The method of any of Aspects 1 to 6, wherein the local processing information includes a path identifier that identifies the route for monitoring performance of the network.

Aspect 8. The method of any of Aspects 1 to 7, wherein the local processing information includes per-packet marking bits for control, telemetry, and security functions.

Aspect 9. The method of any of Aspects 1 to 8, wherein the encapsulated packet comprises an IPv6 packet.

Aspect 10. The method of any of Aspects 1 to 9, further comprising receiving packet including a control message associated with another network node from a requesting device; encapsulating the packet including the control message, wherein a header of the packet includes a destination address including a route to the other network node, wherein least significant bits of a source address of the encapsulated packet are masked based on a length of the local processing information; and forwarding the encapsulated packet to a next network node of the network identified in the destination address.

Aspect 11. A method of a transit network node, comprising receiving an packet from a network node, wherein a header of the packet includes a route to a destination address in a destination address field and local processing information in a source address field; modifying the header of the packet to remove an address of the network node receiving the packet; determining that the local processing information identifies a function for the network node to perform; perform the function identified in the local processing information; and after performing the function, forwarding the packet with the local processing information to a next node identified in the packet.

Aspect 12. The method of Aspect 11, wherein the local processing information is located in least significant bits of the source address field.

Aspect 13. The method of any of Aspects 11 to 12, wherein the further comprising: modifying the header of the packet to remove an address of the network node in the destination address field, wherein the local processing information in the source address field is maintained.

Aspect 14. The method of any of Aspects 11 to 13, wherein the local processing information identifies at least one of a slice identifier that identifies packet treatment, entropy for load balancing operations, a path identifier for determining packet loss in a network, or per-packet marking bits for control, telemetry, and security functions.

Aspect 15. The method of any of Aspects 11 to 14, wherein the network node is configured to use a fixed amount of least significant bits of the local processing information to identify one of a slice identifier that identifies packet treatment, entropy for load balancing operations, a path identifier for determining packet loss in a network, and per-packet marking bits unique to each packet for control, telemetry, and security functions.

Aspect 16. The method of any of Aspects 11 to 15, further comprising receiving a packet including a control message from a requesting device; determining that least significant bits in a source address of a header of the packet are masked to exclude local processing metadata; extracting an address of the requesting device from most significant bits in the source address of the header of the third packet; determining a return route to the requesting device; and transmitting a response message to the requesting device, wherein a header of the response message includes the return route to the requesting device in a destination address field.

Aspect 17. A network device, comprising one or more processors; and when executed by the one or more processors, cause the one or more processors to receive a first packet from a source device that is to be delivered to a destination address through a network; determine a route to the destination address; encapsulate the first packet in a second packet, wherein a header of the second packet includes the route to the destination address in a destination address field and local processing information associated with the at least one function in a source address field; and forward the second packet to a next network node of the network identified in the destination address.

Aspect 18. The network device of Aspect 17, wherein the local processing metadata identifies at a length of the local processing metadata and a configuration of the local processing metadata.

Aspect 19. The network device of any of Aspects 17 to 18, wherein the configuration of the local processing metadata identifies at least one of a slice identifier that identifies packet treatment, entropy for load balancing operations, a path identifier for determining packet loss in the network, or per-packet marking bits for control, telemetry, and security functions.

Aspect 20. The network device of any of Aspects 17 to 19, wherein the local processing metadata includes at least one of a slice identifier that identifies packet treatment, entropy bits for load balancing operations, a path identifier for determining path loss, or per-packet marking bits for control, telemetry, and security functions.

What is claimed is:

1. A method comprising:
   receiving a packet from a source device that is to be delivered to a destination address through a network;
   determining a route to the destination address through at least one network node of the network;
   identifying, from local processing information located in least significant bits of a source address field, a slice identifier, the slice identifier identifies a network slice and an associated service level agreement for transmitting the packet through the network;
   encapsulating the packet, wherein a header of the encapsulated packet includes the route to the destination address in a destination address field and the local processing information, wherein the local processing information includes the slice identifier, and the local processing information is associated with at least one local processing function to be performed locally at the at least one network node of the route and stored in the source address field, wherein the slice identifier identifies packet treatment;
   forwarding the encapsulated packet to a next network node of the network identified in the destination address; and
   performing the at least one local processing function in the local processing information.

2. The method of claim 1, wherein the slice identifier identifies entropy for load balancing operations, a path identifier for determining packet loss in the network, or per-packet marking bits for control, telemetry, and security functions.

3. The method of claim 1, wherein the local processing information includes entropy bits for load balancing operations.

4. The method of claim 1, wherein the local processing information includes a path identifier that identifies the route for monitoring performance of the network.

5. The method of claim 1, wherein the local processing information includes per-packet marking bits for control, telemetry, and security functions.

6. The method of claim 1, wherein the encapsulated packet comprises an IPv6 packet.

7. The method of claim 1, further comprising:
   receiving packet including a control message associated with another network node from a requesting device;
   encapsulating the packet including the control message, wherein a header of the packet includes a destination address including a route to the another network node, wherein least significant bits of a source address of the encapsulated packet are masked based on a length of the local processing information; and forwarding the encapsulated packet to a next network node of the network identified in the destination address.

8. A method of a transit network node, comprising:

receiving a packet from a network node traversing a route through a network to a destination address, wherein a header of the packet includes the route to the destination address in a destination address field and local processing information associated with at least one local processing function in a source address field, wherein the local processing function that is associated with the local processing information is to be performed locally at the transit network node, wherein the local processing information is located in least significant bits of the source address field;

identifying, from the local processing information, a slice identifier, the slice identifier identifies a network slice and an associated service level agreement for transmitting the packet through the network;

modifying the header of the packet to remove an address of the network node receiving the packet;

determining that the local processing information is associated with the local processing function for the transit network node to perform;

perform the function identified in the local processing information, wherein the function at least includes configuring the transit network node to transmit the packet according the associated service level agreement, wherein the slice identifier identifies packet treatment; and after performing the function, forwarding the packet in accordance with the service level agreement with the local processing information to a next node identified in the packet.

9. The method of claim 8, further comprising:

modifying the header of the packet to remove an address of the network node in the destination address field, wherein the local processing information in the source address field is maintained.

10. The method of claim 9, wherein the slice identifier identifies entropy for load balancing operations, a path identifier for determining packet loss in a network, or per-packet marking bits for control, telemetry, and security functions.

11. The method of claim 8, wherein the network node is configured to use a fixed amount of least significant bits of the local processing information to identify the slice identifier that identifies packet treatment, entropy for load balancing operations, a path identifier for determining packet loss in a network, and per-packet marking bits unique to each packet for control, telemetry, and security functions.

12. The method of claim 8, further comprising:

receiving a packet including a control message from a requesting device;

determining that least significant bits in a source address of a header of the packet are masked to exclude local processing metadata;

extracting an address of the requesting device from most significant bits in the source address of the header of a third packet;

determining a return route to the requesting device; and transmitting a response message to the requesting device, wherein a header of the response message includes the return route to the requesting device in a destination address field.

13. A network device, comprising:

one or more processors; and at least one non-transitory computer-readable medium having stored thereon instructions that, when executed by the one or more processors, cause the one or more processors to:

receive a first packet from a source device that is to be delivered to a destination address through a network;

determine a route to the destination address through at least one network node of the network;

identifying, from local processing information located in least significant bits of a source address field, a slice identifier, the slice identifier identifies a network slice and an associated service level agreement for transmitting the packet through the network;

encapsulate the first packet in a second packet, wherein a header of the second packet includes the route to the destination address in a destination address field and the local processing information, wherein the local processing information includes the slice identifier, and the local processing information is associated with at least one function to be performed locally at the at least one network node of the route and stored in the source address field, wherein the slice identifier identifies packet treatment;

forward the second packet to a next network node of the network identified in the destination address; and performing the at least one local processing function in the local processing information.

14. The network device of claim 13, wherein the local processing information identifies at a length of the local processing information and a configuration of the local processing metadata.

15. The network device of claim 14, wherein the configuration of the local processing information identifies entropy for load balancing operations, a path identifier for determining packet loss in the network, or per-packet marking bits for control, telemetry, and security functions.

16. The network device of claim 13, wherein the slice identifier identifies entropy bits for load balancing operations, a path identifier for determining path loss, or per-packet marking bits for control, telemetry, and security functions.

* * * * *